US009767702B2

(12) United States Patent
Bernhardt

(10) Patent No.: US 9,767,702 B2
(45) Date of Patent: Sep. 19, 2017

(54) SMART HEADSET SYSTEM

(71) Applicant: The Boeing Company, Chicago, IL (US)

(72) Inventor: Roger D. Bernhardt, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 14/608,136

(22) Filed: Jan. 28, 2015

(65) Prior Publication Data

US 2017/0018195 A1 Jan. 19, 2017

(51) Int. Cl.

| | |
|---|---|
| ***G06F 19/00*** | (2011.01) |
| ***G08G 5/02*** | (2006.01) |
| ***G08G 5/00*** | (2006.01) |
| ***H04R 5/033*** | (2006.01) |

(52) U.S. Cl.

CPC ........... *G08G 5/025* (2013.01); *G08G 5/0013* (2013.01); *G08G 5/0021* (2013.01); *H04R 5/033* (2013.01); *H04R 2460/07* (2013.01)

(58) Field of Classification Search

CPC ......... G08G 5/025; G08G 5/0047; H04R 1/10
USPC ........................................................... 701/16
See application file for complete search history.

(56) References Cited

U.S. PATENT DOCUMENTS

| | | | | |
|---|---|---|---|---|
| 6,798,392 B2 * | 9/2004 | Hartwell | ................ | A42B 3/046 345/158 |
| 6,934,633 B1 * | 8/2005 | Gallagher | .............. | G01C 21/00 342/357.52 |
| 9,247,779 B1 * | 2/2016 | Aloumanis | ............ | G08G 1/137 |
| 9,389,677 B2 * | 7/2016 | Hobby | .................... | G06F 3/005 |

OTHER PUBLICATIONS

Defense Advanced Research Projects Agency (DARPA), Broad Agency Announcement, All Source Positioning and Navigation (ASPN), Strategic Technology Office, DARPA-BAA-11-14, Nov. 2010, 54 pages.

Defense Advanced Research Projects Agency (DARPA), Broad Agency Announcement, All Source Positioning and Navigation (ASPN) Phase 2, Strategic Technology Office, DARPA-BAA-12-25, Jun. 11, 2012, 61 pages.

* cited by examiner

*Primary Examiner* — Thomas G Black
*Assistant Examiner* — Luke Huynh
(74) *Attorney, Agent, or Firm* — Kolisch Hartwell, P.C.

(57) ABSTRACT

A system and method for providing landing guidance to an aircraft may include an aviation headset having one or more sensors and one or more antennas, a position module configured to determine a position of the headset, and an encoder module for encoding the position information as an audible subchannel. The encoded audible subchannel may be included with voice transmissions via the aircraft radio. A guidance portion may receive the transmission and analyze the encoded audible subchannel to determine the position of the aircraft. Landing guidance may be communicated based on a comparison of the position with a desired glide path.

28 Claims, 4 Drawing Sheets

SMART HEADSET SYSTEM

CROSS-REFERENCES

The following related applications and materials are incorporated herein, in their entireties, for all purposes: U.S. Pat. Nos. 6,798,392 and 6,934,633.

FIELD

This disclosure relates to landing assistance systems for aircraft. More specifically, the disclosed embodiments relate to systems and methods for determining and communicating aircraft position information during an assisted landing.

INTRODUCTION

Aircraft operators may be assisted in landing an aircraft by systems such as the Instrument Landing Systems (ILS) or Precision Approach Radar (PAR). ILS, for example, utilizes a ground-based radio beam transmission and other signals to communicate lateral and vertical guidance to an aircraft approaching a landing site. ILS equipment must be provided onboard the aircraft, as well as maintained, calibrated, and certified. Accordingly, not all aircraft are capable of being guided by ILS.

PAR is a radar-based system generally used by the military to provide lateral and vertical guidance to approaching military aircraft. The aircraft's position relative to a glide path is determined by the PAR radar, and a PAR operator provides spoken guidance to the pilot over a standard radio communication channel. Accordingly, no PAR-specific equipment is needed onboard the aircraft in order to utilize the PAR system. However, PAR systems are costly to install and maintain, and are not present at all landing sites.

SUMMARY

The present disclosure provides an aviation headset system, which may include a wearable headset including a headphone speaker. A position module may be operatively connected to the headset, the position module including a sensor, two antennas, and a processor configured to determine headset position information independently, based on input from the sensor and two antennas. An encoder module may be in communication with the position processor, the encoder module configured to encode the position information as an audible tone signal, the audible tone signal having a frequency outside the range of radio voice communications.

In some embodiments, a landing guidance system may include a wearable aviation headset portion having a plurality of antennas in communication with a position module, the position module being configured to determine position information regarding the headset portion based on inputs from the plurality of antennas, and an encoder module in communication with the position module, the encoder module configured to encode the position of the headset portion as an audio subchannel. A first radio may be configured to transmit and receive audio communications, the first radio in communication with the wearable headset portion such that the audio subchannel is transmitted by the first radio. A guidance portion may include a second radio configured to receive the audio subchannel transmitted by the first radio, and a decoder module configured to determine the position information based on the content of the audio subchannel.

In some embodiments, a method for providing landing guidance to an aircraft operator may include determining information corresponding to a position of a headset located on an aircraft, based on inputs from one or more sensors and one or more antennas integrated with the headset. The information may be encoded in an information-carrying audible signal. The information-carrying audible signal may be transmitted to a guidance system using a radio on the aircraft. A signal including the information-carrying audible signal may be received using the guidance system. The information corresponding to the position of the headset may be extracted. The information may be compared to a desired path of the aircraft. Guidance may be communicated to the aircraft in response to the comparison.

Features, functions, and advantages may be achieved independently in various embodiments of the present disclosure, or may be combined in yet other embodiments, further details of which can be seen with reference to the following description and drawings.

DESCRIPTION

Overview

Figure 1:
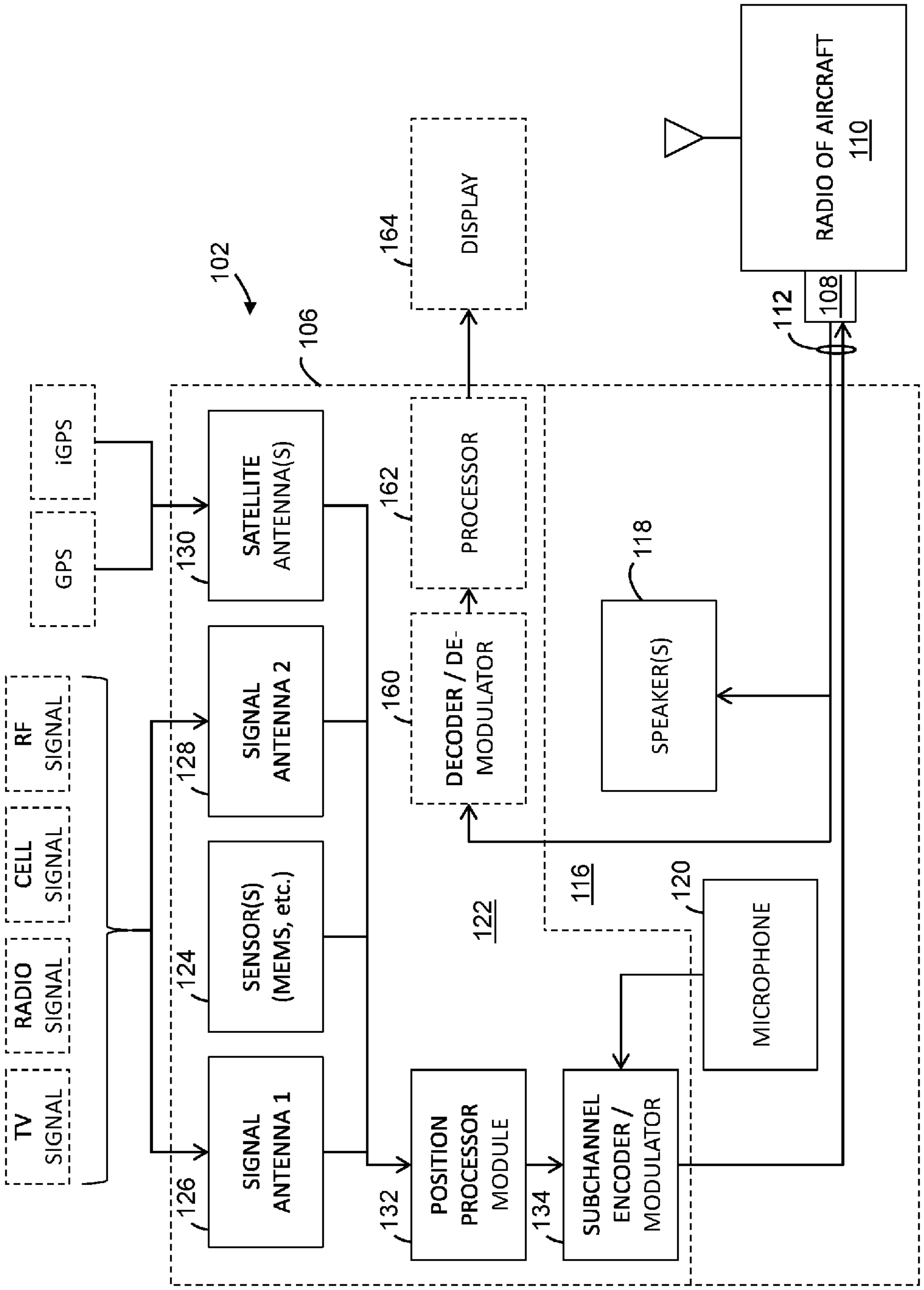
FIG. 1 is a schematic diagram depicting components of an illustrative smart headset system for use on board an aircraft.

Various embodiments of devices and methods relating to a smart headset system for use in guided landing of aircraft are described below and illustrated in the associated drawings. Unless otherwise specified, smart headset systems and methods, and/or their various components may, but are not required to, contain at least one of the structure, components, functionality, steps, and/or variations described, illustrated, and/or incorporated herein. Furthermore, the structures, components, functionalities, and/or variations described, illustrated, and/or incorporated herein in connection with the present teachings may, but are not required to, be included in other guidance systems or methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

A smart headset system may include a headset portion wearable by an aircraft operator (e.g., a pilot) and a ground-based guidance portion installed or otherwise present at a landing site. To facilitate providing of landing guidance to the operator, the headset portion may be configured to communicate a position of the aircraft to the ground, and to receive instructions from the ground (or other suitable location). Accordingly, the headset portion may include a positioning navigation and timing (PNT) module configured to determine (independently) the position of the headset and therefore of the aircraft. The PNT module may include any suitable circuit or circuits configured to determine lateral position (e.g., latitude and longitude) and/or vertical position (e.g., altitude) based on signals received from various sensors and/or antennas. The PNT module, also referred to as the position module, may determine position information independently. In other words, position of the headset may be determined solely based on information and inputs from headset components and without additional input from aircraft systems.

The various sensors and/or antennas may be integrated or otherwise operatively connected to the headset portion, which may include headphones and/or a helmet. For example, the headset portion may include a satellite antenna for receiving signals from a global navigation satellite system (GNSS), such as GPS and/or iGPS, one or more antennas for receiving electromagnetic (EM) signals such as radio frequency (RF) signals. Sensors and other input mechanisms may include one or more optical and/or infrared (IR) cameras, barometers, photometers, thermometers, accelerometers, gyroscopes, and/or magnetometers. These and other suitable sensors may be implemented as microelectromechanical systems (MEMS). Additionally, the headset portion may include one or more speakers (e.g., headphones) and one or more microphones, as typical with standard aviation headsets.

As described above, the PNT module may include a circuit or processor configured to determine the position of the headset (and thus the aircraft) based on the signal and sensor inputs. For example, signals may be received from sources having known locations, such as radars, radio stations, television stations, and the like. Receiving these signals with spaced-apart receiver antennas may allow directional analysis based on the phase difference between those antennas. Similarly, a visual light or infrared camera may be configured to recognize one or more landmarks through the aircraft windscreen. In some examples, these may include artificial landmarks, whether or not constructed for this purpose. Positional information may be determined based on the angular bearing to the landmark(s).

In another example, signals may be received from the global positioning system (GPS) and/or the high integrity global positioning system (iGPS) and interpreted to determine and/or supplement positional information. Any suitable combination of these and/or other techniques may be utilized to determine the position of the aircraft based on signals of convenience and/or onboard sensors. An example suitable for fulfilling some or all aspects of the PNT module is DARPA's Adaptable Navigation System (ANS), which includes the precision Inertial Navigation System (PINS) and All Source Positioning and Navigation (ASPN) system.

Once the aircraft's position is determined, it must be communicated to the ground operator. The ground operator may be in a location other than the "ground." Accordingly, a ground operator may be interchangeably referred to as a guidance operator. A smart headset in accordance with aspects of the present disclosure is configured to "walk on" to the aircraft, meaning the device is able to be plugged into existing aircraft systems without modification of those systems. More specifically, the smart headset may be configured to be plugged into the standard jack of the onboard radio transceiver, and to communicate the position of the aircraft over a standard voice channel without modifying the onboard equipment.

In some embodiments, this communication is done via an audio subchannel. For example, a processor and/or encoder of the headset may produce a tone pattern that encodes the position information. For example, position encoding may be conducted using the existing National Marine Electronics Association (NMEA) standard. The information-carrying tone pattern may be transmitted to the ground station over the standard voice channel, along with any voice transmission the operator may desire. The tone pattern may be produced at a frequency within the standard audible range (e.g., 20 Hz to 20 kHz), but at a frequency that is not typically utilized in voice communication.

For example, an 80 Hz signal may be used. While this signal may be audible, it should not interfere with spoken communications if any are needed. The frequency of transmitted voice communications, for example, is typically between 300 Hz and 3 kHz. Accordingly, the tone signal may be separated for analysis from the overall signal by filtering equipment without affecting the comprehensibility of expected vocal transmissions. In some examples, the frequency chosen for the tone signal may be one that is included in a standard transmission, but which is outside the range of frequencies reproduced by the headphones. Alternatively (or additionally), a notch filter may be included downstream of the analyzing circuit to remove the tone signal before feeding the headphones. Accordingly, the transmitted signal may be received and analyzed, but not heard by the operator.

Upon receiving and decoding the position information transmitted by the aircraft, the ground portion of the smart headset system may display or otherwise communicate the position of the aircraft to an operator. The operator may include a human operator and/or a guidance computer. The position of the aircraft may be compared to a desired position, such as a desired glide path. Suitable instructions for the aircraft operator may be generated based on the comparison, and communicated to the aircraft operator.

Guidance to be communicated to the aircraft operator may be produced as commands spoken by a ground-based operator over the radio, such as in existing PAR systems. Additionally or alternatively, computer-generated commands may be communicated automatically. These commands may take the form of audible commands, tones, textual commands, or graphical information. For example, textual commands and/or graphics indicating a relationship to the desired glide path may be displayed in the aircraft. For example, such a display may be produced on a head-up display (HUD) portion of the headset and/or projected on a suitable surface within the aircraft.

To communicate guidance automatically, automated voice commands may be transmitted over the radio and interpreted by the human aircraft operator. Additionally or alternatively, in some embodiments, data carrying guidance information may be transferred from the ground/guidance station to the aircraft. Accordingly, the smart headset system may include an encoding module in the ground or guidance portion and decoding module in the headset portion. These modules would be configured to work together to transmit a second audible data signal over the radio, in a fashion similar to that described above regarding the air-to-ground tone signal. To avoid interference, the second audible data signal may be produced at a frequency different from the frequency of the air-to-ground tone.

Aspects of a smart headset system, such as software-defined radios, signal processors, controllers, encoders, and the like, may be embodied as a computer method, computer system, or computer program product. Accordingly, aspects of the smart headset system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the smart headset system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the smart headset system may be written in one or any combination of programming languages, including an object-oriented programming language such as Java, Smalltalk, C++, and/or the like, and conventional procedural programming languages, such as the C programming language. The program code may execute entirely on a local computer, partly on the local computer, as a stand-alone software package, partly on the local computer and partly on a remote computer, or entirely on a remote computer or server. In the latter scenario, the remote computer may be connected to the local computer through any type of network, wirelessly or otherwise, including a local area network (LAN) or a wide area network (WAN), and/or the connection may be made to an external computer (for example, through the Internet using an Internet Service Provider).

Aspects of the smart headset system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the smart headset system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following examples describe selected aspects of exemplary smart headset systems as well as related systems and/or methods. These examples are intended for illustration and should not be interpreted as limiting the entire scope of the present disclosure. Each example may include one or more distinct inventions, and/or contextual or related information, function, and/or structure.

Example 1

Figure 2:
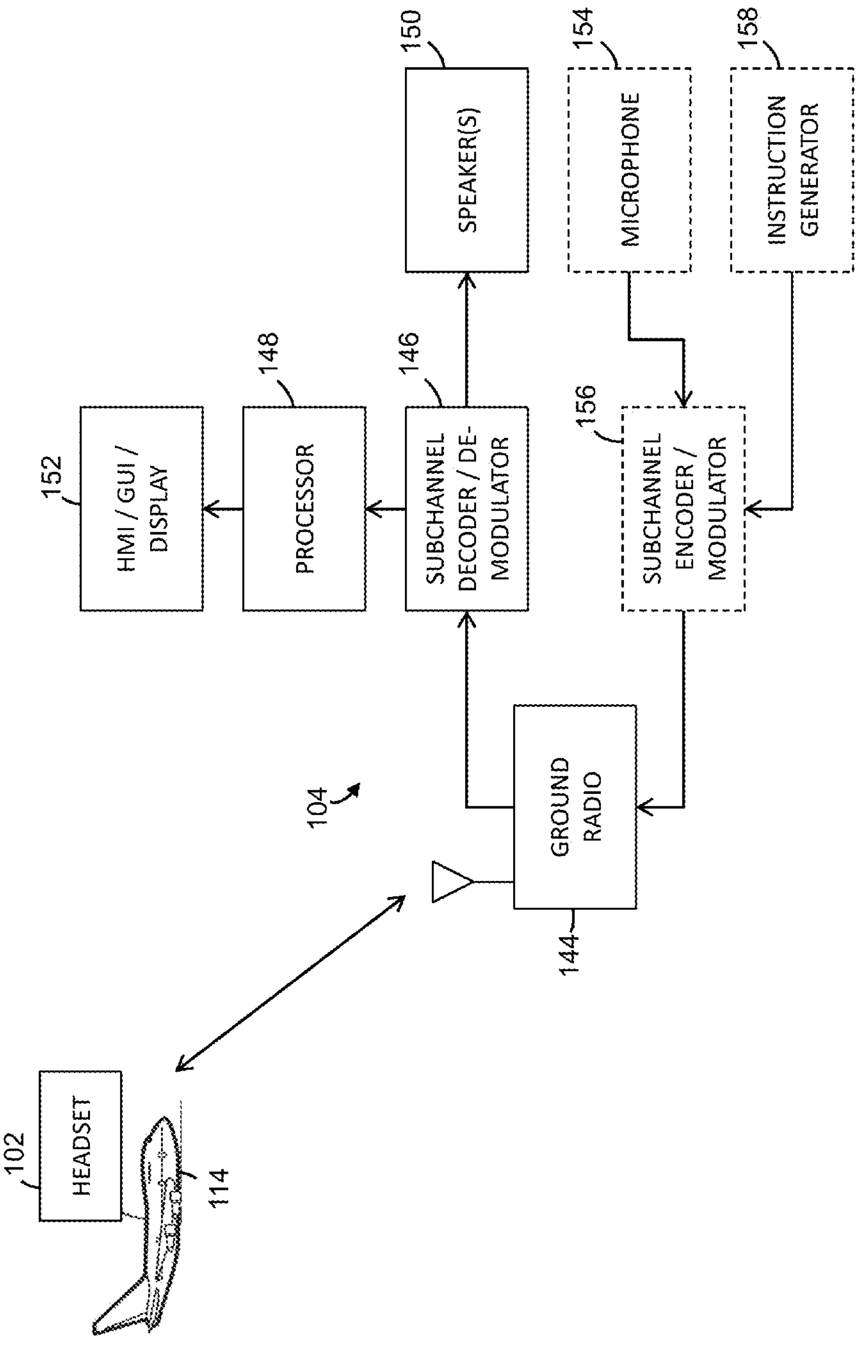
FIG. 2 is a schematic diagram depicting components of an illustrative ground-based system suitable for use with a smart headset system.
Figure 3:
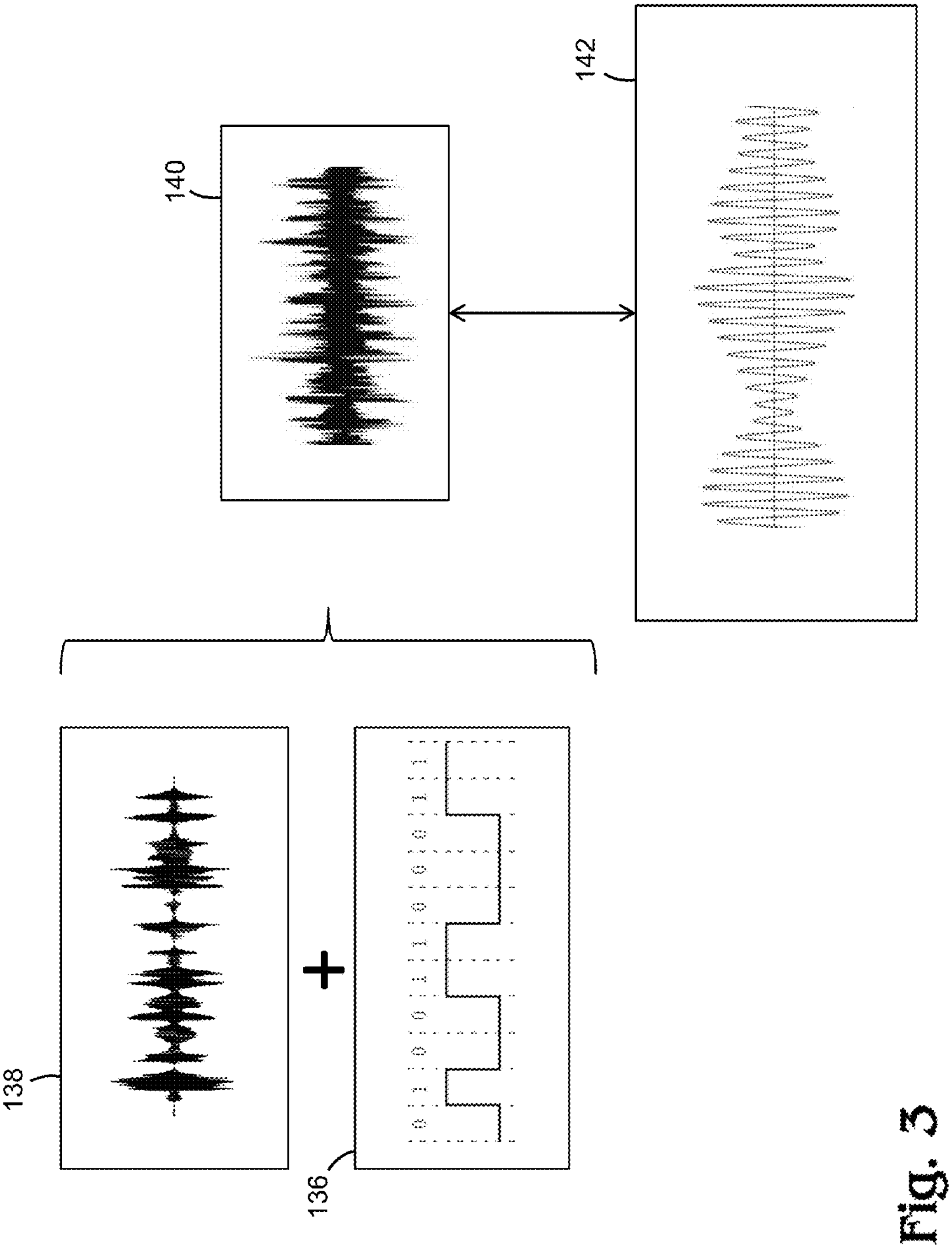
FIG. 3 is a schematic diagram showing combination and modulation of illustrative audible signals.

This Example describes an illustrative smart headset system 100, which is an embodiment of the smart headset system described generally above; see FIGS. 1-3.

Smart headset system 100 includes a headset portion 102 and a ground or guidance portion 104. FIG. 1 is a schematic diagram illustrating relationships between elements of headset portion 102. FIG. 2 is a schematic diagram illustrating relationships between elements of guidance portion 104.

With reference to FIG. 1, headset portion 102 includes a headset 106, which is connectable to an audio jack 108 of an aircraft radio 110 via a radio interface, such as a cable 112 having a plug configured to mate with jack 108. Aircraft radio 110 may include any suitable radio configured to transmit and receive modulated audio communications over RF. For example, aircraft radio 110 may include a VHF communication transceiver installed on an aircraft 114.

Headset 106 may include any suitable aviation headset and/or flight helmet having components configured to determine the position of the headset based on data from integrated sensors and/or signals received from integrated antennas, to encode information corresponding to that position, and to communicate the encoded information through cable 112 for subsequent modulation and transmission via radio 110. In some examples, headset 106 is wearable. In some examples, headset 106 may include components that are handheld or separately mountable within the aircraft, such as a microphone or individual speakers. In this example, a user interface portion 116 of headset 106 includes one or more speakers 118 (e.g., headphones) and a microphone 120. For example, headset 106 may include an aviation headset integrating over-ear headphones (e.g., including ear cups) and a boom microphone.

A PNT module portion 122 of headset 106 may include one or more sensors 124, two or more RF antennas, represented as a first antenna 126 and a second antenna 128, and one or more satellite antennas 130. Signals from sensors 124, antennas 126, 128, and 130 may feed into a position processor 132, also referred to as a position processing module.

As described above, sensors 124 may include any suitable combination of MEMS or other types of sensors, such as accelerometers, cameras, barometers, and/or gyroscopes. Antennas 126 and 128 may include any suitable devices configured to receive signals from known sources of RF transmissions, such as television and/or radio broadcasts, cell tower signals, and other RF signals (e.g., from known transmitters at the landing site). Satellite antenna(s) 130 may include any suitable device configured to receive satellite transmissions from known GNSS sources, such as GPS and/or iGPS.

Signals from the various sensors and/or antennas may be received by position processing module 132 for analysis. For example, module 132 may be programmed or otherwise configured to monitor known frequencies and conduct a phase difference analysis based on recognized signals received at both antenna 126 and antenna 128. In some examples, module 132 may include software-defined radios or the like, to assist with position analysis based on RF signals received. Module 132 may be configured to determine or supplement position information based on the GNSS signals received by antenna 130. Sensors 124 may be further utilized to determine or augment position information. For example, barometer readings may be used to determine or supplement altitude calculation. As discussed above, a suitable PNT module portion 122 may include aspects of the ASPN and/or PINS systems.

Position information determined by the position processing module is then fed, in real time, either continuously or on a periodic basis, to a subchannel encoder 134. Encoder 134 may be interchangeably referred to as an encoder module and/or modulator. Encoder module 134 may be configured to encode the position information using a selected encoding method, such as using the NMEA standard for PNT information. This encoded data may then be included in an outgoing transmission as an audible tone.

With reference to FIG. 3, a data-carrying tone 136 may be produced, including one or more tones configured to communicate binary information. For example, an 80 Hz tone may be present or absent, with presence indicating a binary "1" and absence indicating a binary "0". Accordingly, the tone may be utilized to encode and communicate the position determined by module 132. Tone signal 136 may be transmitted alone or in combination with a voice signal 138 received by microphone 120. Signal 136 may be referred to as a subchannel. Signals 138 and 138 may be combined into a composite audible signal 140, which is conducted through cable 112 to radio 110. Radio 110 may then modulate the signal for transmission, producing, for example, an amplitude modulated RF signal 142. As indicated in FIG. 3, this process may be performed in reverse, taking modulated RF signal 142, converting it to a composite audible signal 140, and then extracting the data-carrying tone signal 136 from the voice signal 138. This may be done, for example, at ground portion 104 upon receiving a signal from aircraft 114.

Turning now to FIG. 2, ground portion 104 includes a ground-based radio 144, which may include any suitable device configured to receive and demodulate RF signal 142 transmitted by aircraft 114. Ground/guidance portion 104 may include a subchannel decoder 146. Decoder 146 may include any suitable module configured to separate tone signal 136 from combined signal 140 and to work with a processor module 148 to decode the information carried by the tone signal and determine the communicated position of the aircraft. For example, decoder 146 may include an isolator circuit such as a bandpass filter configured to pass the frequency(ies) on which encoded tone signal 136 operates. Accordingly, the output of the bandpass filter may correspond to tone signal 136 and the binary or otherwise encoded information may be extracted.

In some examples, decoder 146 may include a bandstop or notch filter downstream of the bandpass filter, to prevent tone signal 136 from reaching an operator's headphones or speakers 150. In some examples, speakers 150 may not be capable of reproducing the audible frequency corresponding to signal 136. In some examples, tone signal 136 is not filtered or otherwise prevented from reaching speakers 150. For example, tone signal 136 may be audible as a hiss or low-frequency rumble, which may not affect voice communications.

In response to determining the vertical and/or lateral position of aircraft 114 based on the information contained in subchannel 136, ground portion 104 may communicate the position information to a ground operator. For example, position information may be displayed graphically, textually, audibly, and/or symbolically through a human machine interface (HMI), graphical user interface (GUI), and/or other suitable display or interface, as indicated at reference number 152 in FIG. 2.

Based on a comparison of actual position vs. desired position, instructions may be communicated to the aircraft operator over ground radio 144. In some embodiments, a ground operator may speak commands into a microphone 154 to be transmitted over the radio circuit, as usual in radio communications. Additionally or alternatively, in some embodiments, data may be transmitted on a radio subchannel in the same manner as described above regarding signal 136. Accordingly, a subchannel encoder 156 may be included to encode this information into a tone signal for transmission with any existing voice communications.

In some embodiments, the ground operator may be replaced or augmented by an automated guidance system. For example, instructions or instruction-related information (e.g., direction to regain glide path, etc.) may be produced by an instruction generator 158. Instruction generator 158 may include an automatic instruction generation module that compares actual to desired aircraft position and produces voice or data instructions for transmission to aircraft 114. In some examples, instruction generator 158 may include an interface for a ground operator, who may input information for transmission in addition to spoken guidance commands.

Headset portion 106 may include a decoder module 160 and processor 162 configured to extract and process guidance information if provided by guidance portion 104. This decoder module and processor would be functionally similar to decoder 146 and processor 148. Processor 162 may be configured to present the extracted and decoded guidance information to the aircraft operator. For example, headset portion 106 may include a HUD or graphical projector in communication with processor 162, indicated by a display 164 in FIG. 1.

Example 2

Figure 4:
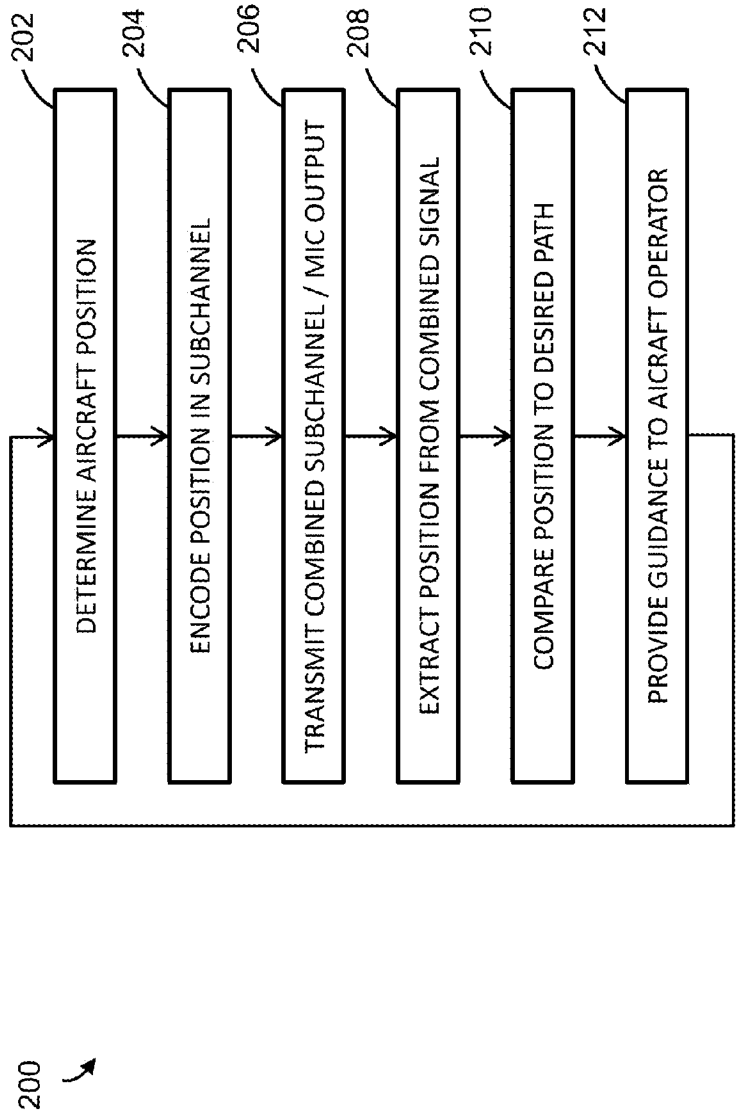
FIG. 4 is an illustration of steps performed by an exemplary method for assisting an aircraft operator in landing an aircraft.

This example describes a method 200 for providing position-aware approach and landing guidance to an aircraft over existing aircraft radio communication channels, using a smart headset system; see FIG. 4. Aspects of smart headset systems described above may be utilized in the method steps described below. Where appropriate, reference may be made to previously described components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. FIG. 4 depicts multiple steps of a method, generally indicated at 200, which may be performed in conjunction with smart headset systems according to aspects of the present disclosure. Although various steps of method 200 are described below and depicted in FIG. 4, the steps need not necessarily all be performed, and in some cases may be performed in a different order than the order shown.

At step 202, a position of the aircraft is determined by a headset system based on sensor information and signals of convenience. For example, GNSS (e.g., GPS and iGPS) signals may be received by a satellite antenna, EM (e.g., RF) signals of various types may be received by spaced-apart antennas, and various integrated sensors such as accelerometers and barometers may provide additional signals. These various signals may be analyzed by a position processor, which may be configured to determine a vertical and/or lateral position of the aircraft. For example, the headset system may include a position processor module configured to analyze the phase difference between two antennas. When two spaced-apart antennas on the headset receive an RF signal from a transmitter having a known physical location, information regarding the position of the receiving headset can be determined based on the phase difference of the received signals. Aspects of the ASPN system may be utilized at this step.

At step 204, the aircraft position is encoded (e.g., converted to binary data) and converted to an audible signal. The audible signal, which may include an intermittent tone, may be produced at any audible frequency outside the normal range of human speech. For example, the encoded signal tone may be produced at approximately 75 to approximately 85 Hz, as well as any other suitable frequency.

At step 206, the information-carrying tone signal may be combined with an output of the headset microphone (e.g., spoken communication from the operator), if any, into a composite audible signal. The composite audible signal may then be communicated to the aircraft radio for transmission.

At step 208, the transmitted composite audible signal may be received and analyzed by a ground radio system. For example, the information-carrying tone signal may be separated (actually or virtually) from the composite audible signal and decoded to obtain the position information. Any voice communications from the aircraft operator are passed to speakers such as headphones worn by a ground operator. The tone signal may be passed to the speakers along with the voice signal. In some embodiments, the tone signal may be filtered out before reaching the speakers. In some embodiments, the tone signal may be outside the frequency range reproduced by the speakers.

At step 210, the position information received from the aircraft is compared to a desired aircraft position. For example, the position information may indicate that the aircraft is above a desired glide path. For example, the position information may indicate that the aircraft is left of the runway. This comparison may be performed entirely or partially by a computer system (e.g., automatically). In some embodiments, comparison may include qualitatively displaying the aircraft position with respect to desired position. In some embodiments, comparison may include displaying the quantitative results of the comparison, such as a distance and direction from the desired position.

At step 212, guidance may be provided to the aircraft operator. For example, instructions may be generated that, if followed, would correct the aircraft's position with respect to a desired path. In some embodiments, these instructions may be generated automatically. In some examples, the instructions may be generated by a ground operator. In some embodiments, the instructions may be communicated as oral commands or requests spoken over the radio voice channel. In some embodiments, the instructions may be communicated as encoded data through an audible subchannel, as described above. Encoded communications may be decoded and provided to the aircraft operator visually or audibly. For example, the headset system may include a HUD, on which guidance may be projected.

Example 3

This section describes additional aspects and features of aviation headset systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

1. An aviation headset system comprising:
   a wearable headset including a headphone speaker;
   a position module operatively connected to the headset, the position module including a sensor, two antennas, and a processor configured to determine headset position information independently, based on input from the sensor and two antennas; and
   an encoder module in communication with the position processor, the encoder module configured to encode the position information as an audible tone signal, the audible tone signal having a frequency outside the range of radio voice communications.
2. The headset system of paragraph 1, the headset further including a microphone having an output in communication with the encoder module, wherein the encoder module is further configured to combine the output of the microphone with the audible tone signal.

3. The headset system of paragraph 1, wherein the frequency of the audible tone signal is in the range of approximately 75 Hz to approximately 85 Hz.
4. The headset system of paragraph 1, wherein the headset includes a radio interface configured to place the headset in communication with an input of an aircraft radio.
5. The headset system of paragraph 4, wherein the radio interface includes a cable having a plug configured to mate with an audio jack of the radio.
6. The headset system of paragraph 1, further comprising a guidance portion separate from the headset, the guidance portion including a decoder module configured to decode the position information contained in the audible tone signal.
7. The headset system of paragraph 6, the guidance portion further including a processor module configured to compare the position information to a desired path.
8. The headset system of claim 6, the encoder module being further configured to combine the data-carrying audible tone signal with a voice signal into a composite audible signal, the composite audible signal including the position information, wherein based on a comparison of decoded actual position versus desired position, instructions may be communicated to the aircraft operator.
9. A landing guidance system including:

a wearable aviation headset portion having a plurality of antennas in communication with a position module, the position module being configured to determine position information regarding the headset portion based on inputs from the plurality of antennas, and an encoder module in communication with the position module, the encoder module configured to encode the position of the headset portion as an audio subchannel;

a first radio configured to transmit and receive audio communications, the first radio in communication with the wearable headset portion such that the audio subchannel is transmitted by the first radio; and a guidance portion including a second radio configured to receive the audio subchannel transmitted by the first radio, and a decoder module configured to determine the position information based on the content of the audio subchannel.

10. The landing guidance system of paragraph 9, the wearable aviation headset further including a microphone, wherein the system is further configured such that an output of the microphone is transmitted by the first radio in combination with the audio subchannel.
11. The landing guidance system of paragraph 10, the guidance portion further including an isolator circuit configured to isolate the audio subchannel for analysis by the decoder module.
12. The landing guidance system of paragraph 9, the guidance portion further including a processor configured to compare the position information to a desired path.
13. The landing guidance system of paragraph 12, further including a human-machine interface in communication with the processor and configured to display information corresponding to the position information and the desired path.
14. The landing guidance system of paragraph 9, wherein the audio subchannel is a first audio subchannel and the encoder module is a first encoder module, the guidance portion further including a second encoder module configured to encode landing guidance information as a second audio subchannel.
15. A method for providing landing guidance to an aircraft operator, the method including:

determining information corresponding to a position of a headset located on an aircraft, based on inputs from one or more sensors and one or more antennas integrated with the headset;

encoding the information in an information-carrying audible signal;

transmitting the information-carrying audible signal to a guidance system using a radio on the aircraft;

receiving a signal including the information-carrying audible signal using the guidance system;

extracting the information corresponding to the position of the headset;

comparing the information to a desired path of the aircraft; and communicating guidance to the aircraft in response to the comparison.

16. The method of paragraph 15, wherein communicating guidance includes communicating instructions to reduce a difference between the position information and the desired path.
17. The method of paragraph 15, wherein comparing the information to the desired path includes displaying the information and the desired path on a user interface.
18. The method of paragraph 15, wherein transmitting the information-carrying audible signal includes transmitting additional audible information combined with the information-carrying audible signal, and extracting the information includes isolating the information-carrying audible signal from the received signal.
19. The method of paragraph 18, wherein the guidance system includes at least one speaker, and the method further includes preventing the information-carrying audible signal from being produced by the speaker.
20. The method of paragraph 19, wherein preventing includes passing the received signal through a notch filter to remove the information-carrying audible signal.
21. The method of paragraph 15, wherein the guidance system is disposed at a landing site.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. An aviation headset system comprising:

a wearable headset including a headphone speaker;

a position module operatively connected to the headset, the position module including a sensor, two antennas, and a processor configured to determine headset position information independently, based on input from the sensor and two antennas;

an encoder module in communication with the position processor, the encoder module configured to encode the position information as an audible tone signal, the audible tone signal having a frequency outside the range of radio voice communications; and a guidance portion separate from the headset, the guidance portion including a decoder module configured to decode the position information contained in the audible tone signal.

2. The headset system of claim 1, the headset further including a microphone having an output in communication with the encoder module, wherein the encoder module is further configured to combine the output of the microphone with the audible tone signal.

3. The headset system of claim 1, wherein the frequency of the audible tone signal is in the range of approximately 75 Hz to approximately 85 Hz.

4. The headset system of claim 1, wherein the headset includes a radio interface configured to place the headset in communication with an input of an aircraft radio.

5. The headset system of claim 4, wherein the radio interface includes a cable having a plug configured to mate with an audio jack of the radio.

6. The headset system of claim 1, the encoder module being further configured to combine the data-carrying audible tone signal with a voice signal into a composite audible signal, the composite audible signal including the position information, wherein based on a comparison of decoded actual position versus desired position, instructions may be communicated to the aircraft operator.

7. The headset system of claim 1, the guidance portion further including a processor module configured to compare the position information to a desired path.

8. A landing guidance system including:

a wearable aviation headset portion having a plurality of antennas in communication with a position module, the position module being configured to determine position information regarding the headset portion based on inputs from the plurality of antennas, and an encoder module in communication with the position module, the encoder module configured to encode the position of the headset portion as an audio subchannel;

a first radio configured to transmit and receive audio communications, the first radio in communication with the wearable headset portion such that the audio subchannel is transmitted by the first radio; and a guidance portion including a second radio configured to receive the audio subchannel transmitted by the first radio, a processor configured to compare the position information to a desired path, and a decoder module configured to determine the position information based on the content of the audio subchannel.

9. The landing guidance system of claim 8, the wearable aviation headset further including a microphone, wherein the system is further configured such that an output of the microphone is transmitted by the first radio in combination with the audio subchannel.

10. The landing guidance system of claim 9, the guidance portion further including an isolator circuit configured to isolate the audio subchannel for analysis by the decoder module.

11. The landing guidance system of claim 8, further including a human-machine interface in communication with the processor and configured to display information corresponding to the position information and the desired path.

12. The landing guidance system of claim 8, wherein the audio subchannel is a first audio subchannel and the encoder module is a first encoder module, the guidance portion further including a second encoder module configured to encode landing guidance information as a second audio subchannel.

13. A method for providing landing guidance to an aircraft operator, the method including:

determining, using a position module having a processor that receives inputs from one or more antennas integrated with a headset located on an aircraft, information corresponding to a position of the headset;

encoding the information in an information-carrying audible signal using an encoder module in communication with the processor of the position module;

transmitting the information-carrying audible signal to a guidance system using a first radio on the aircraft;

receiving a signal including the information-carrying audible signal using a second radio of the guidance system;

extracting the information corresponding to the position of the headset using a decoder module of the guidance system, the decoder module configured to decode the position information contained in the audible signal;

comparing the information corresponding to the position of the headset to a desired path of the aircraft using a processor of the guidance system; and communicating guidance to the aircraft in response to the comparison.

14. The method of claim 13, wherein communicating guidance includes communicating instructions to reduce a difference between the position information and the desired path.

15. The method of claim 13, wherein comparing the information to the desired path includes displaying the information and the desired path on a user interface.

16. The method of claim 13, wherein transmitting the information-carrying audible signal includes transmitting additional audible information from a microphone of the headset combined with the information-carrying audible signal, and extracting the information includes isolating the information-carrying audible signal from the received signal.

17. The method of claim 16, wherein the guidance system includes at least one speaker, and the method further includes preventing the information-carrying audible signal from being produced by the speaker.

18. The method of claim 17, wherein preventing includes passing the received signal through a notch filter to remove the information-carrying audible signal.

19. The method of claim 13, wherein the guidance system is disposed at a landing site.

20. A landing guidance system including:

a wearable aviation headset portion having a plurality of antennas in communication with a position module, the position module being configured to determine position information regarding the headset portion based on inputs from the plurality of antennas, and a first encoder module in communication with the position module, the first encoder module configured to encode the position of the headset portion as a first audio subchannel;

a first radio configured to transmit and receive audio communications, the first radio in communication with the wearable headset portion such that the first audio subchannel is transmitted by the first radio; and a guidance portion including a second radio configured to receive the first audio subchannel transmitted by the first radio, a decoder module configured to determine the position information based on the content of the first audio subchannel, and a second encoder module configured to encode landing guidance information as a second audio subchannel.

21. The landing guidance system of claim 20, the wearable aviation headset further including a microphone, wherein the system is further configured such that an output of the microphone is transmitted by the first radio in combination with the first audio subchannel.

22. The landing guidance system of claim 21, the guidance portion further including an isolator circuit configured to isolate the first audio subchannel for analysis by the decoder module.

23. The landing guidance system of claim 20, the guidance portion further including a processor configured to compare the position information to a desired path.

24. The landing guidance system of claim 23, further including a human-machine interface in communication with the processor and configured to display information corresponding to the position information and the desired path.

25. A landing guidance system including:

a wearable aviation headset portion having a microphone, a plurality of antennas in communication with a position module, the position module being configured to determine position information regarding the headset portion based on inputs from the plurality of antennas, and an encoder module in communication with the position module, the encoder module configured to encode the position of the headset portion as an audio subchannel;

a first radio configured to transmit and receive audio communications, the first radio in communication with the wearable headset portion such that the first radio transmits an output of the microphone in combination with the audio subchannel; and a guidance portion including a second radio configured to receive the audio subchannel transmitted by the first radio, and a decoder module configured to determine the position information based on the content of the audio subchannel, and an isolator circuit configured to isolate the audio subchannel for analysis by the decoder module.

26. The landing guidance system of claim 25, the guidance portion further including a processor configured to compare the position information to a desired path.

27. The landing guidance system of claim 26, further including a human-machine interface in communication with the processor and configured to display information corresponding to the position information and the desired path.

28. The landing guidance system of claim 25, wherein the audio subchannel is a first audio subchannel and the encoder module is a first encoder module, the guidance portion further including a second encoder module configured to encode landing guidance information as a second audio subchannel.

* * * * *